(12) United States Patent
Soehren

(10) Patent No.: US 7,561,960 B2
(45) Date of Patent: Jul. 14, 2009

(54) MOTION CLASSIFICATION METHODS FOR PERSONAL NAVIGATION

(75) Inventor: Wayne A. Soehren, Wayzata, MN (US)

(73) Assignee: Honeywell International Inc., Morristown, NJ (US)

(*) Notice: Subject to any disclaimer, the term of this patent is extended or adjusted under 35 U.S.C. 154(b) by 335 days.

(21) Appl. No.: 11/534,511

(22) Filed: Sep. 22, 2006

(65) Prior Publication Data

US 2007/0250261 A1 Oct. 25, 2007

Related U.S. Application Data

(60) Provisional application No. 60/745,235, filed on Apr. 20, 2006.

(51) Int. Cl.
*G01C 21/00* (2006.01)

(52) U.S. Cl. .................. 701/207; 701/200; 701/209; 340/988

(58) Field of Classification Search .............. 701/200, 701/207, 208–211; 340/988, 995.1; 600/595; 702/160

See application file for complete search history.

(56) References Cited

U.S. PATENT DOCUMENTS

| | | | |
|---|---|---|---|
| 5,583,776 A | 12/1996 | Levi et al. | |
| 6,522,266 B1 | 2/2003 | Soehren et al. | |
| 6,546,336 B1 | 4/2003 | Matsuoka et al. | |
| 6,882,955 B1 | 4/2005 | Ohlenbusch et al. | |
| 2001/0022828 A1 | 9/2001 | Pyles | |
| 2005/0197769 A1 | 9/2005 | Soehren et al. | |

FOREIGN PATENT DOCUMENTS

| | | |
|---|---|---|
| EP | 1253404 | 10/2002 |
| WO | 2005091113 | 9/2005 |

*Primary Examiner*—Gertrude Arthur Jeanglaud
(74) *Attorney, Agent, or Firm*—Fogg & Powers LLC

(57) ABSTRACT

A personal navigation system including one or more sensors that sense motion of a human and output signals corresponding to the motion of the human and a human-motion-classification processing block that receives sensor data from the one or more sensors. The human-motion-classification processing block includes a Kalman filter processing block, an inertial navigation processing block, and a motion classification processing block. The Kalman filter processing block executes a Kalman filter that provides corrections to the motion classification processing block. The inertial navigation processing block receives input sensor data from the sensors and outputs a navigation solution. The motion classification processing block executes a motion classification algorithm that implements a step-time threshold between two types of motion, identifies a type of motion based on the received sensor data, and outputs a distance-traveled estimate to the Kalman filter processing block based on the identified type of motion.

20 Claims, 8 Drawing Sheets

MOTION CLASSIFICATION METHODS FOR PERSONAL NAVIGATION

This application claims the benefit of U.S. Provisional Application No. 60/745,235, filed on Apr. 20, 2006, which is incorporated herein by reference in its entirety.

GOVERNMENT LICENSE RIGHTS

The U.S. Government may have rights in the invention under Government Contract # NBCHC040129 awarded by the DARPA.

BACKGROUND

Reliable navigation systems have always been essential for estimating both distance traveled and position. Some of the earliest type of navigation systems relied upon navigation by stars, or celestial navigation. Prior to the development of celestial navigation, navigation was done by "deduced" (or "dead") reckoning. In dead-reckoning, the navigator finds his position by measuring the course and distance he has moved from some known point. Starting from a known point the navigator measures out his course and distance from that point. Each ending position would be the starting point for the next course-and-distance measurement.

In order for this method to work, the navigator needs a way to measure his course, and a way to measure the distance moved. Course is typically measured by a magnetic compass, although other methods, such as a heading gyroscope, could also be used. Distance is determined by a time and speed calculation: the navigator multiplied the speed of travel by the time traveled to get the distance. For a person traveling by foot, traditionally the distance measurement was computed by counting steps then multiplying the number of steps by the individuals average step length. This navigation system, however, is highly prone to errors, which when compounded can lead to highly inaccurate position and distance estimates.

An example of a more advanced navigation system is an inertial navigation system (INS). The basic INS consists of gyroscopes, accelerometers, a navigation computer, and a clock. Gyroscopes are instruments that sense angular rate. They are used to give the orientation of an object (for example: angles of roll, pitch, and yaw of an airplane). Accelerometers sense a linear change in rate (acceleration) along a given axis. Inertial navigation systems are particularly useful for an application where the trajectory of the vehicle or person does not maintain a fixed course or speed while traveling (i.e. high dynamics).

In one implementation of this embodiment, three mutually orthogonal gyroscopes and three mutually orthogonal accelerometers provide sensor data to the inertial navigation system. This accelerometer configuration provides three orthogonal acceleration components which can be vectorially summed. Combining the gyroscope-sensed orientation information with the summed accelerometer outputs yields the INS's total acceleration in 3D space. At each time-step of the system's clock, the navigation computer time integrates this quantity once to get the body's velocity vector. The velocity vector is then time integrated, yielding the position vector. These steps are continuously iterated throughout the navigation process.

Dead reckoning techniques can provide a better long-term solution; however, for best performance, these techniques require motion that is predictable (i.e., nearly constant step size and in a fixed direction relative to body orientation). Integrating traditional inertial navigation and dead reckoning techniques offers a solution to achieve optimal geographic location performance in the absence of GPS or other radio-frequency positioning aids.

Global Positioning System (GPS) is one of the most recent developments in navigation technology. GPS provides highly accurate estimates of position and distance traveled. GPS uses satellites to transmit signals to receivers on the ground. Each GPS satellite transmits data that indicates its location and the current time. All GPS satellites synchronize operations so that these repeating signals are transmitted at the same instant. The signals, moving at the speed of light, arrive at a GPS receiver at slightly different times because some satellites are farther away than others. The distance to the GPS satellites can be determined by estimating the amount of time it takes for their signals to reach the receiver. When the receiver estimates the distance to at least four GPS satellites, it can calculate its position in three dimensions.

When available, positioning aids such as GPS control navigation error growth. GPS receivers, however, require an unobstructed view of the sky, so they are used only outdoors and they often do not perform well within forested areas or near tall buildings. In these situations, an individual using a GPS is without an estimate speed and position.

The U.S. Pat. No. 6,522,266 entitled "NAVIGATION SYSTEM, METHOD AND SOFTWARE FOR FOOT TRAVEL" that issued on Feb. 18, 2003 describes a method of handling unusual motions (relative to walking) such as side-stepping, which can cause significant errors if the unusual motion is used for an extended period of time. U.S. Pat. No. 6,522,266 is also referred to here as the "the 266 patent" and is hereby incorporated herein by reference.

A need exists for a personal navigation system that defines and implements a step-time threshold to delineate types of motion, such as walking and running, and that generates and implements model parameters specific for each type of motion in order to provide an individual with estimates of position and distance traveled. It is also desirable for the personal navigation system to integrate the best navigation features of known navigation techniques with the step-time threshold and the model parameters specific for each type of motion regardless of variations in the step length for different types of motion, regardless of variations in the direction of the step, and regardless of the terrain over which they might travel.

SUMMARY

A personal navigation system including one or more sensors adapted to sense motion of a human and to output signals corresponding to the motion of the human and a human-motion-classification processing block that receives sensor data from the one or more sensors. The human-motion-classification processing block includes a Kalman filter processing block, an inertial navigation processing block, and a motion classification processing block.

The Kalman filter processing block executes at least one Kalman filter that provides corrections to the motion classification processing block. The inertial navigation processing block receives input sensor data from the one or more sensors and outputs a navigation solution. The motion classification processing block executes a motion classification algorithm that implements a step-time threshold between two types of motion, identifies a type of motion based on the received sensor data, and outputs a distance-traveled estimate to the Kalman filter processing block based on the identified type of motion.

DRAWINGS

In accordance with common practice, the various described features are not drawn to scale but are drawn to emphasize features relevant to the present invention. Reference characters denote like elements throughout figures and text.

DETAILED DESCRIPTION

Figure 1A:
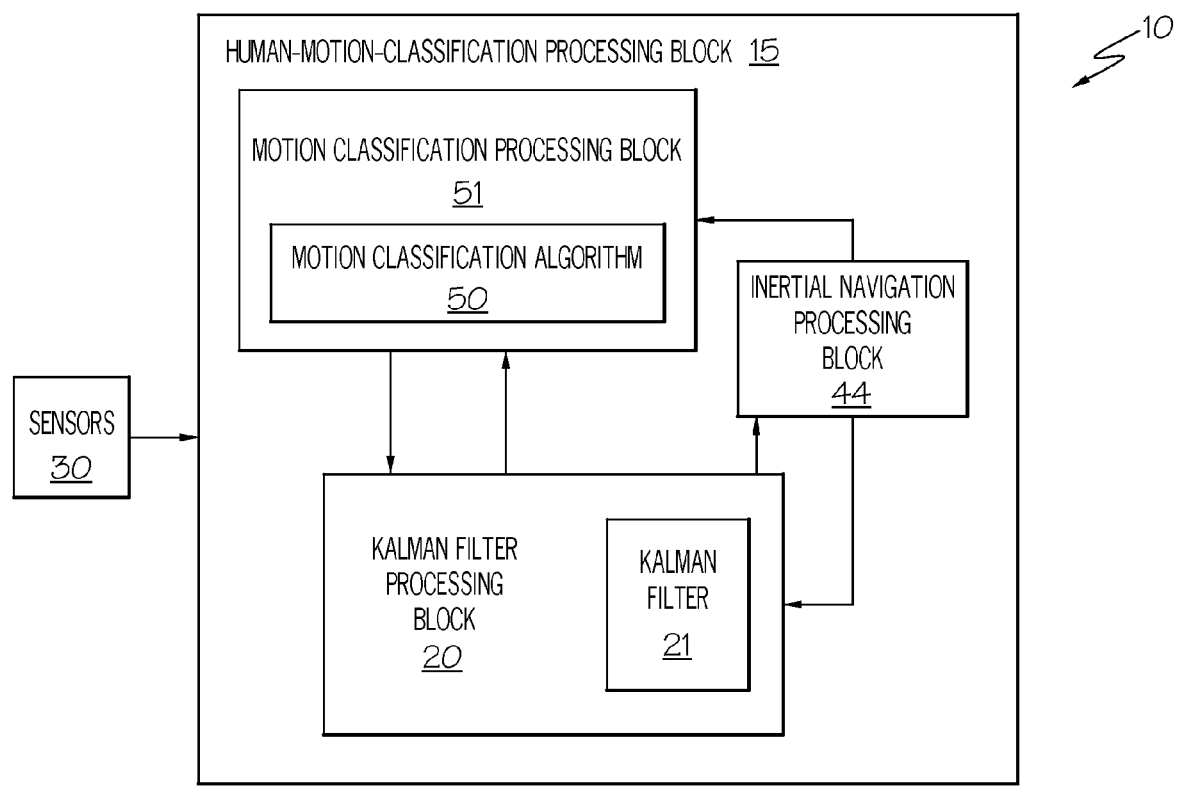
FIG. 1A is a block diagram of one embodiment of a personal navigation system in accordance with the present invention.

FIG. 1A is a block diagram of one embodiment of a personal navigation system in accordance with the present invention. The personal navigation system 10 includes one or more sensors 30 and a human-motion-classification processing block 15. The human-motion-classification processing block 15 includes a Kalman filter processing block 20, a motion classification processing block 51 and an inertial navigation processing block.

The sensors 30 are strapped to a human and output signals corresponding to the motion of the human to the human-motion-classification processing block 15. The human-motion-classification processing block 15 receives sensor data from the one or more sensors 30.

The Kalman filter processing block 20 includes at least one Kalman filter 21. The Kalman filter processing block 20 executes at least one of the Kalman filters 21. The motion classification processing block executes a motion classification algorithm 50 that implements a step-time threshold between two types of motion. The motion classification processing block 51 identifies a type of motion based on the received sensor data and outputs a distance-traveled estimate to the Kalman filter processing block 20 based on the identified type of motion. The Kalman filter 21 provides corrections to the motion classification processing block 51.

Figure 1B:
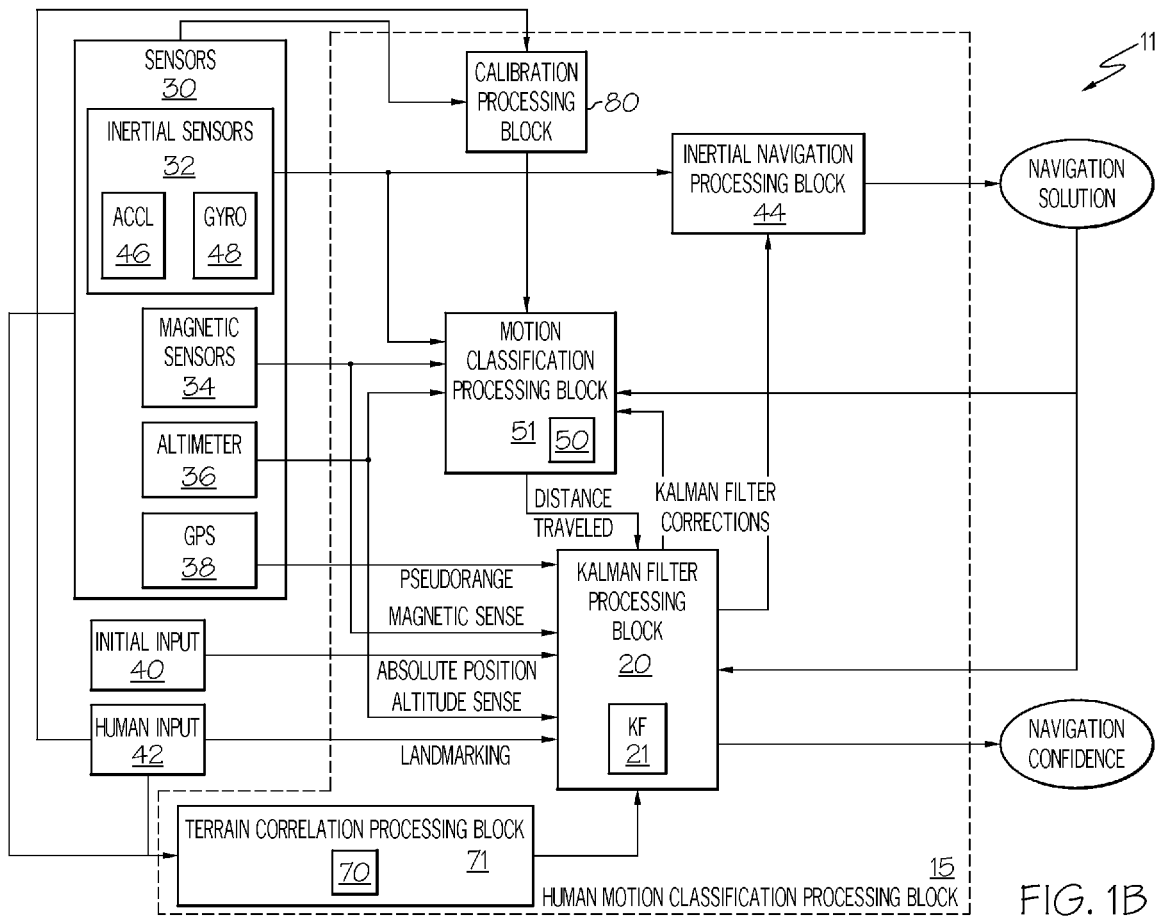
FIG. 1B is a block diagram of one embodiment of a personal navigation system in accordance with the present invention.

FIG. 1B is a block diagram of one embodiment of a personal navigation system 11 in accordance with the present invention. The personal navigation system 11 includes one or more sensors 30 and a human-motion-classification processing block 15 which is outlined by dashed lines. The human-motion-classification processing block 15 includes a Kalman filter processing block 20, a motion classification processing block 51, an inertial navigation processing block 44, a terrain correlation processing block 71, and a calibration processing block 80. The sensors 30 sense motion of a human and output signals corresponding to the motion of the human to the human-motion-classification processing block 15. The human-motion-classification processing block 15 receives sensor data from the one or more sensors 30. In one implementation of this embodiment, the human-motion-classification processing block 15 is a single microprocessor.

The Kalman filter processing block 20 executes the Kalman filter 21 to output a Kalman filter corrections. In one implementation of this embodiment, the Kalman filter processing block 20 includes processors that pre-process and/or pre-filter the input to the Kalman filter 21. The motion classification processing block 51 executes a motion classification algorithm 50 that implements a step-time threshold between two types of motion. The motion classification processing block 51 identifies a type of motion based on the received sensor data and outputs a distance-traveled estimate to the Kalman filter processing block 20 based on the identified type of motion. The at least one Kalman filter 21 provides corrections to the motion classification processing block 51. The terrain correlation processing block 71 executes a terrain correlation algorithm 70 and output information indicative of a location to the Kalman filter processing block 20.

In one implementation of this embodiment, the terrain correlation processing block 71 and/or the calibration processing block 80 are not included in the personal navigation system 11. In another implementation of this embodiment, the calibration processing block 80 is included in the Kalman filter processing block 20.

The personal navigation system is strapped on a human and then the sensors 30 sense motion of the human and output signals corresponding to the motion of the human to the Kalman filter processing block 20 and to the motion classification algorithm 50 in the motion classification processing block 51. The sensors 30 include one or more global positioning systems 38, one or more magnetic sensors 34, one or more pressure sensors or altimeters 36, one or more inertial sensors 32, and combinations thereof. The one or more inertial sensors 32 include one or more accelerometers 46 and one or more gyroscopes 48. The accelerometers 46 and the gyroscopes 48 are communicatively coupled to the inertial navigation processing block 44 and the motion classification processing block 51 to output sensor data based on the motions of the user to the inertial navigation processing block 44 and the motion classification processing block 51.

The motion classification processing block 51 receives sensor data from sensors 30 and executes the motion classification algorithm 50 to identify a type of motion based on the received sensor data. The motion classification processing block 51 outputs a distance-traveled estimate to the Kalman filter processing block 20 based on the identified type of motion. The motion classification algorithm 50 implements a step-time threshold between multiple types of motion. The types of motion include, but are not limited to, walking forward, walking backward, running forward, stopped, and walking sideways.

In order to determine the step-time threshold, the step model parameters for each individual user are determined during an initial calibration of the personal navigation system 11. The step length is defined as:

$$dl = \frac{l_0 dt_s}{dt_s - S} \quad (1)$$

where $dt_s$ is the time period of the step and $l_0$ and S are step model parameters. The time period of the step (i.e., time between each step) is also referred to here as a step period. The step model parameters vary with the motion type. In the exemplary system, a linear relationship between step size and walking speed that is tailored to the individual user is used. One example of this linear relationship is found in Biomechanics and Energetics of Muscular Exercise, by Rodolfo Margaria (Chapter 3, pages 107-124. Oxford: Clarendon Press 1976). Based on additional artifacts, along with acceleration information, a rate at which the individual is stepping is estimated by the motion classification algorithm 50. The step period $dt_s$ and the step model parameters $l_0$ and S for the type of motion are used by the motion classifier to estimate the step length dl based on the classification of the motion by the motion classification algorithm 50.

The step-time threshold $dt_{threshold}$ is the step-time threshold between walking and running and is defined mathematically as:

$$dt_{threshold} = \frac{\left(\frac{l_{0walk}}{2.12344} + S_{walk}\right) + \left(\frac{l_{0run}}{2.12344} + S_{run}\right)}{2} \quad (2)$$

where $l_{0run}$ and $S_{run}$ are the running model parameters, and $l_{0walk}$ and $S_{walk}$ are the walking model parameters. The threshold speed used was 2.12344 m/s or 4.75 miles per hour in equation (2). However, the threshold speed and the model parameters are calibrated for each user. The step-time threshold allows a classification of gaits (running and walking) by calibrating the personal navigation system 11 for the user. In one implementation of this embodiment, more than one step-time threshold is calibrated to classify the gaits between sprinting and running and between running and walking. Within each class (i.e. running and walking), the model automatically adjusts the step length based on the speed (fast or slow running and walking) and it is not necessary to differentiate within the class. In an implementation of this embodiment, in which a model is used in which the step size is fixed (i.e. fixed step size for fast run, slow run, fast walk, slow walk), more than one step-time threshold is calibrated to classify the gaits between fast running and slow running, between slow running and fast walking and between fast walking and slow running.

The model parameters and step-time threshold are stored in the Kalman filter processing block 20 in the personal navigation system 11. The motion classification algorithm 50 implements the step model parameters and the step-time threshold to provide an estimate of the length of each foot step taken by the user based on the change in time between footfalls. The motion classification processing block 51 does not require user to artificially maintain a fixed step length to achieve desired performance for dead reckoning. In one implementation of this embodiment, model data for a number of users is stored in the Kalman filter processing block 20 so that the device can be used by multiple people. In this case, the user inputs his ID into the Kalman filter processing block 20, and their individual model is then used and calibrated during use.

The terrain correlation processing block 71 is communicatively coupled to sensors 30 to received sensor data. From the sensor data and mappings of terrain in the region of the personal navigation system 11, the terrain correlation processing block 71 executes the terrain correlation algorithm 70 to generate an estimate of position. The terrain correlation processing block 71 is communicatively coupled to the Kalman filter processing block 20 to provide an estimate of the location of the human in order to bound the navigational error of the personal navigation system 11. In one implementation of this embodiment, the output from the terrain correlation processing block 71 is blended with the magnetic heading derived from the magnetic sensors 34 and the heading derived from the inertial navigation processing block 44.

The inertial navigation processing block 44 uses the sensor data received from the one or more inertial sensors 32 to determine the position estimate. In one implementation of this embodiment, the inertial sensors 32 include a triad of accelerometers and a triad of gyroscopes that provide the navigation signals of orthogonal movement and direction in three dimensions to the inertial navigation processing block 44. The inertial navigation processing block 44 then processes the signals according to known techniques to provide the position estimate, velocity estimate, and the attitude estimate. The inertial navigation processing block output (navigation solution in block diagram 1B), is also input to the motion classification processing block 50 and to aid in motion classification.

The magnetic sensors 34 are available for initial heading and as a heading aid for the personal navigation system 11. The magnetic sensors 34 are communicatively coupled to the motion classification processing block 51 and the Kalman filter processing block 20 to output magnetic sensor data to the motion classification processing block 51 and the Kalman filter processing block 20. In one example, the magnetic sensors 34 and the accelerometers of the inertial sensors 32 are used to estimate step frequency and direction. In another example, the inertial navigation system heading and the accelerometers of the inertial sensors 32 are used to estimate step frequency and direction. In one embodiment, the magnetic sensors 34 consist of three magnetic sensors mounted orthogonally. Distance traveled and direction of travel are determined using both the frequency of step (i.e., number of steps counted per unit time) along with the heading of the steps. The motion classification processing block 51 executes the motion classification algorithm 50 which implements the estimated step length, the frequency of steps, and the motion direction for the steps, the step-time threshold and the step model for the type of motion, and to calculate the distance traveled estimate.

In the exemplary personal navigation system 11, as motion and direction are sensed by the magnetic sensors 34 and the inertial sensors 32 (e.g., when the individual moves) samples of data are taken from the sensors at a predetermined rate. In one embodiment, the sensors of the inertial sensors 32 are sampled at a rate of 100 samples/second, where measurements are taken on the rates on the three axes and the acceleration on the three axes. The sampled data is then supplied to the inertial navigation processing block 44, the motion classification processing block 51, and the Kalman filter processing block 20 in the human motion classification processing block 15. The inertial navigation processing block 44 processes the data with a navigation algorithm to determine the position estimate, which can include both direction and heading and the distance moved in that direction. The motion classification processing block 51 executes the motion classification algorithm 50 to processes the data to determine the distance-traveled estimate.

Exemplary position-aiding indicators include a global positioning receiver/processor of the GPS 38, and/or the altimeter 36. The pressure sensors or altimeters 36 are available for initial altitude and altitude adjustments of the personal navigation system 11. The altimeter 36 is communicatively coupled to the motion classification processing block 51 and the Kalman filter processing block 20 to provide pressure sensor data to the motion classification processing block 51 and the Kalman filter processing block 20.

In one implementation of this embodiment, altimeters 36 are used to determine the terrain over which the user is moving. In this case, barometric altimeter altitude measurements are processed to measure terrain elevation. The sequence of terrain elevation measurements is correlated with map databases to form position error estimates. Position drift distorts the relative spacing between elevation measurements, and adds noise to the correlation process. The personal navigation system 11 predicts terrain correlation position to fix the accuracy of the location. The terrain correlation is predicted as a function of slope change, sensor noise, and distance traveled. In one implementation of this embodiment, the grid size of a map is constant.

In one implementation of this embodiment, terrain correlation is implemented to offset for changes in the step-time threshold and/or step length of the user when going up or down a slope.

The exemplary personal navigation system 11 incorporates the information gathered from the global positioning system (GPS) 38 or other radio frequency positioning aids to obtain accurate geographic location and distance traveled information. GPS provides superior position and distance traveled information as compared to either the inertial navigation processing block 44 or the motion classification processing block 51. The exemplary personal navigation system 11 uses the GPS 38 to acquire initial position and, possibly, initial calibration. The Kalman filter processing block 20 uses the GPS input to calibrate the motion model for the current motion type, thereby improving the distance-traveled estimates from the motion classification processing block 51 and the inertial navigation processing block 44 to maintain optimal performance. However, GPS, and other RF location aids, are not always available because of satellite or transmitter outages, obstacles to radio-signal transmissions, and so forth. In this case, the personal navigation system relies on the calibrated motion classification processing to estimate the individual's distance traveled as an aid to the inertial navigation processing block via the Kalman filter.

The GPS 38 provides the geographic location data to the Kalman filter processing block 20. In one embodiment, global positioning receiver/processor is used with a differential GPS (d-GPS) system. In an exemplary embodiment, the GPS 38 is a "d-GPS receiver/processor 38." In this case, the d-GPS receiver/processor 38 and the altimeter 36 are incorporated into the personal navigation system 11. The d-GPS receiver/processor 38 allows for information to be gathered which accurately tracks the time and the position of the moving user. The use of the d-GPS receiver/processor 38 allows for an additional set of values for the distance traveled and position for the individual (where the other values for the position and distance traveled were derived from the inertial navigation processing block 44 and the motion classification processing block 51). The d-GPS receiver/processor 38, when available, provides superior position and distance traveled data as compared to either the inertial navigation or motion classification.

The at least one Kalman filter 21 in the Kalman filter processing block 20 provides corrections to the distance-traveled estimate output from the motion classification processing block 51. The Kalman filter 21 receives and integrates the position estimate and the distance traveled estimate to determine corrective feedback signals using the past and present values of the navigation solutions.

The Kalman filter 21 estimates corrective feedback signals and provides the corrective signals to the inertial navigation processing block 44 and to the motion classification processing block 51 in order to correct the navigation error and the position estimate. The Kalman filter 21 also provides feedback internally to the Kalman filter processing block 20. Specifically, the Kalman filter 21 estimates a number of errors, including adjusting the motion model parameters for the current motion type when other aids are available, such as GPS 38. This is a critical function of the Kalman filter in the personal navigation system, as the Kalman filter refines the initial model (from the calibration process) for the user. In one embodiment, the data from the motion classification processing block 51 and the inertial navigation processing block 44 are buffered and samples of the data are sent to the Kalman filter 21. This information provides a measure of the distance and direction traveled over the Kalman filter processing interval. A total distance traveled is estimated by differencing the position estimates from the inertial navigation processing block 44 at the stop and start times of the Kalman filter processing interval. The total distance traveled is also estimated through the use of the motion classification processing block 51 from the rate and number of steps taken by the individual and from the step-time threshold and the step model parameters. The Kalman filter processing block 20 receives the distance-traveled estimates from the inertial navigation processing block 44 and the motion classification processing block 51 and the Kalman filter 21 uses the difference between the two values to calculate an error. The error between these two estimates is taken by the Kalman filter 21 to determine the error corrections for the personal navigation system.

In one embodiment, the Kalman filter 21 allows for poor distance estimates to be identified and ignored through Kalman filter residual testing, thus improving the overall solution. The residual test provides a reasonableness comparison between the solution based on the distance estimate (and heading angle) and the solution computed using the inertial navigation equations. For example, the Kalman filter residual test is used to reject poor measurements from motion classification processing block 51. In the case that the motion classification processing block 51 provides erroneous results, the errors are detectable by the integration Kalman filter 21. For example, if the user moves in an "unusual" manner, for example, when the user walks with their torso turned relative to direction of travel, the personal navigation system rejects the motion classification algorithm input until the error is no longer detected. The personal navigation system 11 essentially operates in "free inertial" mode when motion classification algorithm measurements are rejected. This allows the personal navigation system 11 to combine the best features of dead-reckoning and inertial navigation in the absence of GPS 38 or other RF aids, resulting in positioning performance exceeding that achieved with either method alone.

In an additional embodiment, the present system uses the Kalman filter 21 in a blended inertial navigation system. In the blended inertial navigation system, the magnetic heading derived from the magnetic sensors 34 is compared and integrated with the heading as derived from the inertial navigation processing block 44. The difference between magnetic heading and the heading derived from the inertial navigation processing block 44 becomes another measurement to the Kalman filter 21. The Kalman filter 21 uses this measurement to correct errors in either the magnetic sensors or in the heading derived from the inertial sensors 32 (e.g., from the gyroscopes).

As shown in FIG. 1B, the personal navigation system 11 also includes an initial input 40 in which the user or a GPS 38 inputs an accurate geographic location prior to moving the user moving with the personal navigation system 11 attached to their body. The personal navigation system 11 also includes human input 42. The user can input landmarks that are visible as they move about. In this exemplary personal navigation system 11, the human input 42 is provided to the terrain correlation processing block 71 and to the Kalman filter processing block 20. In another implementation of this embodiment, the user inputs a type of motion to the calibration processing block 80 via the human input 42. This is used for the calibration as described below with reference to FIGS. 6 and 7.

The calibration processing block 80 calibrates the step-time threshold for a human and calibrates step model parameters for the human during a calibration process. In one implementation of this embodiment, the calibration processing block 80 is separate from the personal navigation system 11. In such an implementation, the calibration of the personal navigation system 11 is performed for an individual user while the calibration processing block 80 is communicatively coupled to the personal navigation system 11. In this case, the models generated by the calibration processing block 80 are output to the personal navigation system 11 after the calibration is completed.

This exemplary personal navigation system 11 provides enhanced navigation for users traveling on foot. The exemplary personal navigation system 11 uses inertial navigation information gathered from the individual, a motion classification processing block 51 which identifies the motion type of the individual (e.g., walking) based on a step-time threshold that was calibrated for the user, along with Kalman filtering to estimate travel distance and position. The motion classification provided by the execution of the motion classification algorithm 50, which is calibrated with step model parameters, significantly improves distance traveled estimate while allowing individual to move in a more natural manner. The motion classification allows the personal navigation system 11 to identify the motion type of the user (walking, crawling, side-stepping, etc.) and apply the best model to sensor data to estimate distance traveled. The exemplary Kalman filter 21 compares the data from the motion classification processing block 51 and the navigation solution that is output from the inertial navigation processing block 44 in order to determine reliable travel distance and position information. This information is then used to estimate the individual's position and distance traveled. In one embodiment, the present system is incorporated into a self-contained apparatus, which is worn by the user.

An advantage of the exemplary personal navigation system 11 is the ability to continue to provide accurate estimates of geographic location and distance traveled even when GPS, or other RF positioning aids, are not available. The exemplary personal navigation system 11 solves these, and other, problems by implementing user-calibrated step-time threshold between walking and running and by integrating inertial navigation and motion-model algorithms using the Kalman filter 21 for estimating the geographic location of the user in the absence of GPS or other radio-frequency position aids.

In one implementation of this embodiment, the personal navigation system 11 includes MEMS inertial measurement unit, a three-axis magnetometer, a barometric pressure sensor, and a SAASM GPS receiver and uses human motion-based pedometry algorithms in conjunction with the step-time threshold. An independent measurement of distance traveled is based on use of a step-time threshold in the motion classification algorithm 50.

In one implementation of this embodiment, the personal navigation system 11 includes an MEMS inertial measurement unit, a three-axis magnetometer, a barometric pressure sensor, and a SAASM GPS receiver. In another implementation of this embodiment, the personal navigation system 11 includes of a Honeywell BG1930 MEMS Inertial Measurement Unit (IMU), a Rockwell Collins NavStorm GPS receiver, a Honeywell designed processor, a Honeywell HMR3300 magnetometer, and a Honeywell Precision Altimeter (HPA).

All the connections between the various communicatively coupled components in the personal navigation system 11 are wired connections such as trace lines or conductive wires.

Figure 2:
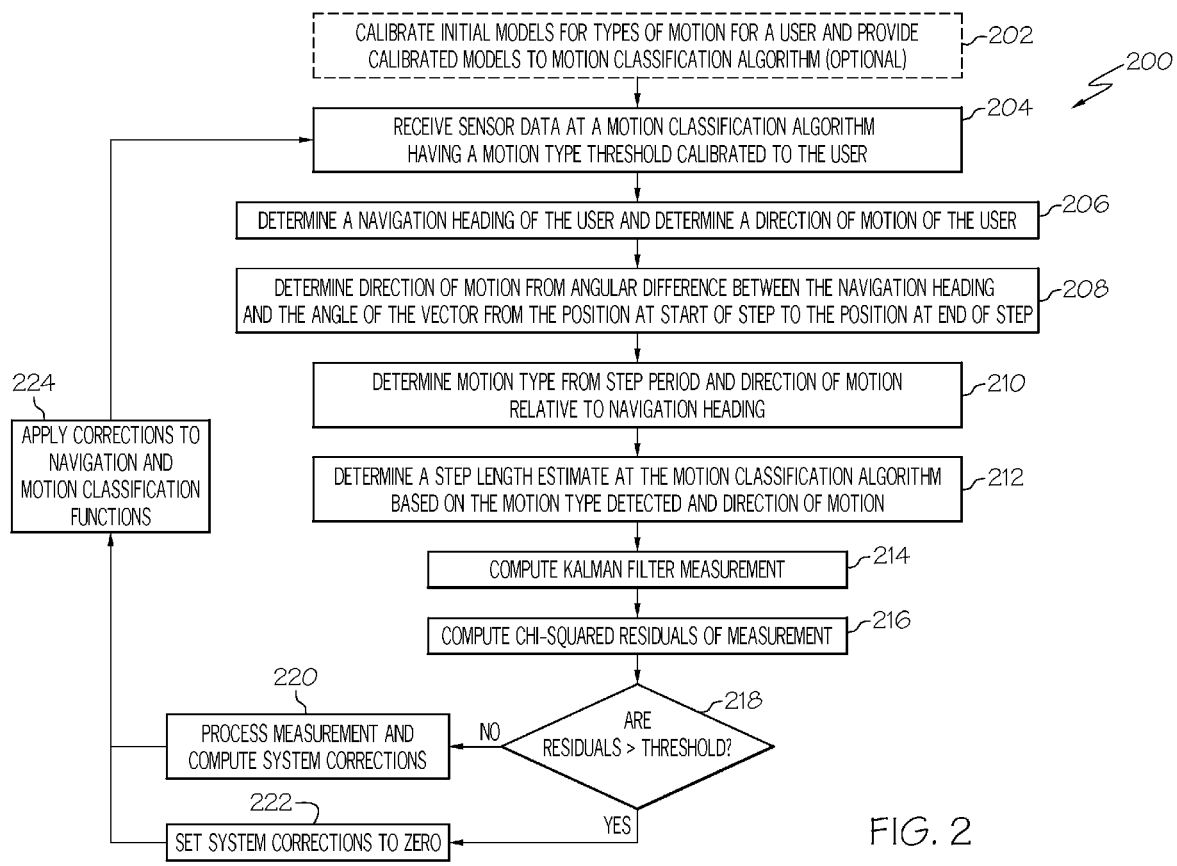
FIG. 2 is a flow diagram of one embodiment of a method to estimate foot travel position in accordance with the present invention.

FIG. 2 is a flow diagram of one embodiment of a method 200 to estimate foot travel position in accordance with the present invention. Method 200 is described with reference to the exemplary personal navigation system 11 of FIG. 1B.

At block 202, the calibration processing block calibrates initial models for types of motion for a user and provides the calibrated model to the motion classification algorithm. The user is a human who straps on the personal navigation system 11 and then walks and runs during the calibration of the personal navigation system 11. Two exemplary methods for calibrating the personal navigation system are described below with reference to method 600 of FIG. 6 and method 700 of FIG. 7. In one implementation of this embodiment, the calibration processing block 80 is implemented with the sensors 30 to determine the step model parameters and the step-time threshold as defined above with reference to FIG. 1B. In this case, the calibration processing block 80 then provides the calibrated model to the motion classification algorithm by inputting the step model parameters and the step-time threshold to the motion classification algorithm 50. Block 202 is an optional element of the process, and is not required for operation of the personal navigation system. The intent of the initial calibration is to provide a more accurate model when the system is used for the first time. If an initial calibration is not conducted, the personal navigation system uses the default models. The user specific model is developed via the Kalman filter 21 when other aids are available, such as GPS 38 or terrain correlation 71.

At block 204, the motion classification algorithm receives sensor data. In one implementation of this embodiment, the motion classification algorithm 50 receives sensor data from the sensors 30 when the motion classification processing block 51 executes the motion classification algorithm 50 during an implementation of the exemplary personal navigation system 11 that is calibrated for the user. The motion classification algorithm determines a step length estimate and outputs the step length estimate, also referred to herein as the distance traveled, to the Kalman filter processing block 20 for each step the user takes. At block 206, the Kalman filter processing block determines a navigation heading of the user and determines a direction of motion of the user. In one implementation of this embodiment, the Kalman filter processing block 20 of the personal navigation system 11 of FIG. 1B determines a navigation heading of the user 100, and determines a direction of motion of the user 100.

Figure 3:
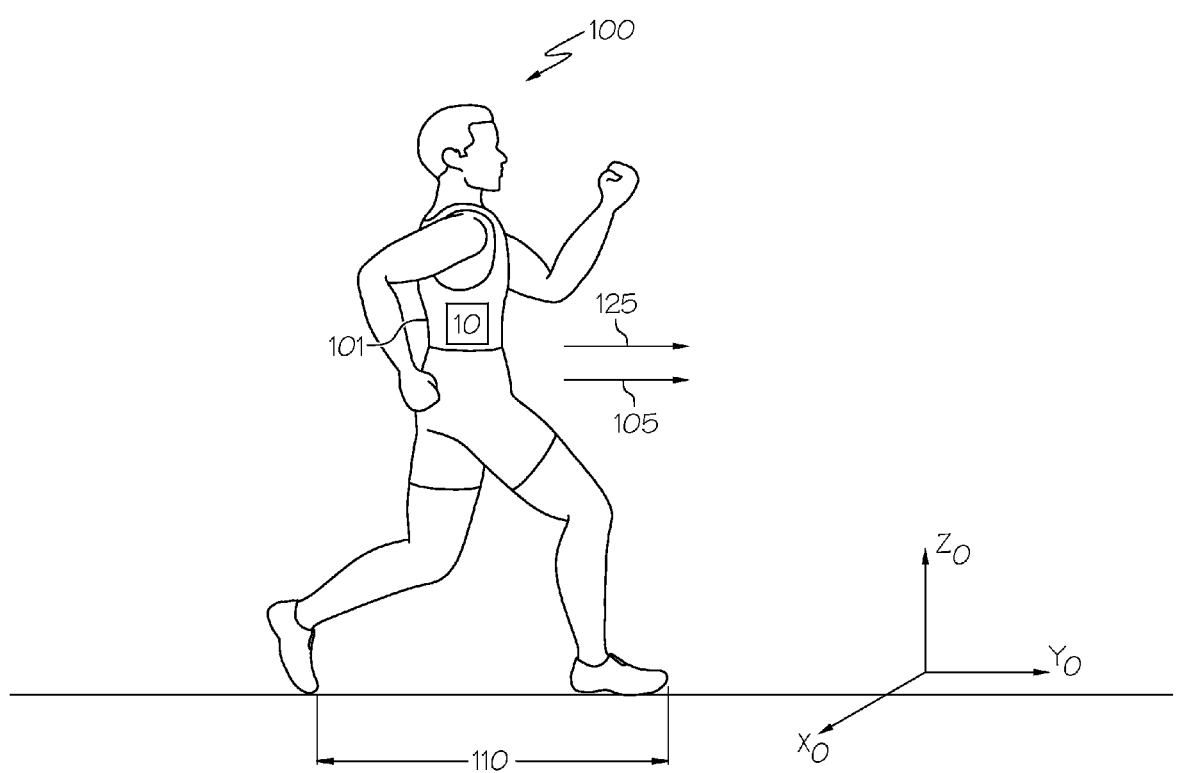
FIG. 3 shows a user running while the personal navigation system estimates the user's position in accordance with the present invention.
Figure 4:
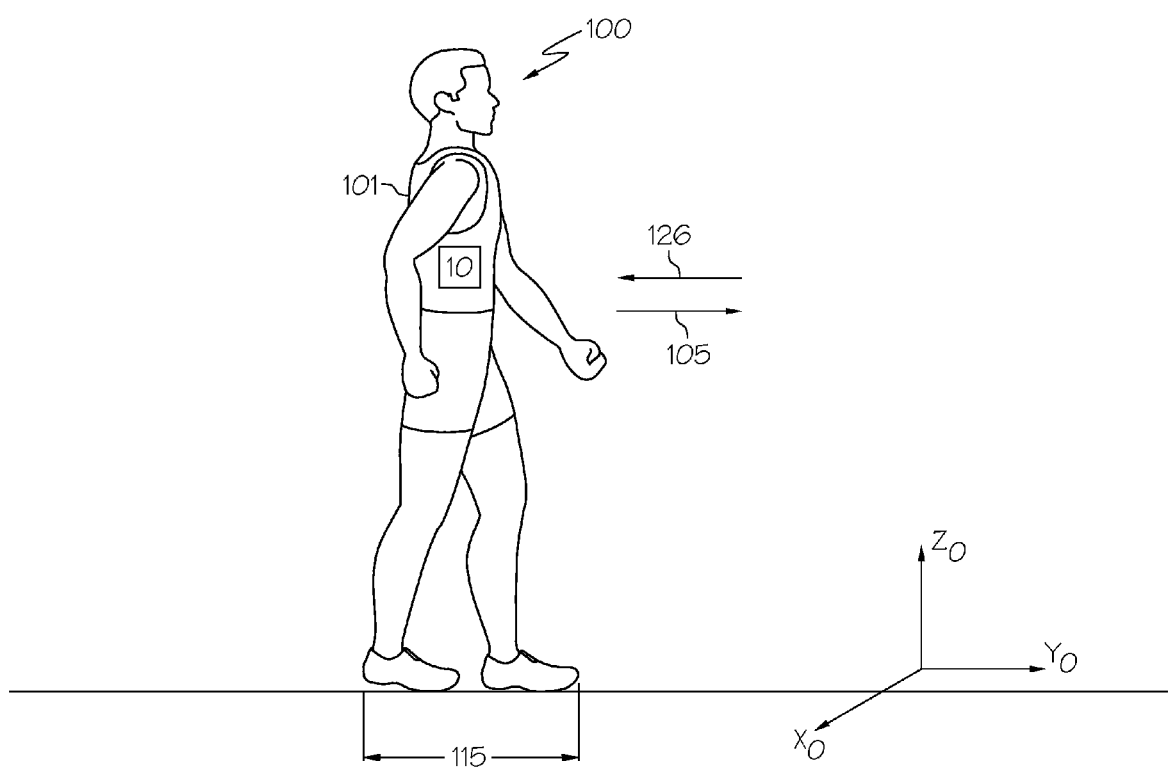
FIG. 4 shows a user walking backward while the personal navigation system estimates the user's position in accordance with the present invention.
Figure 5:
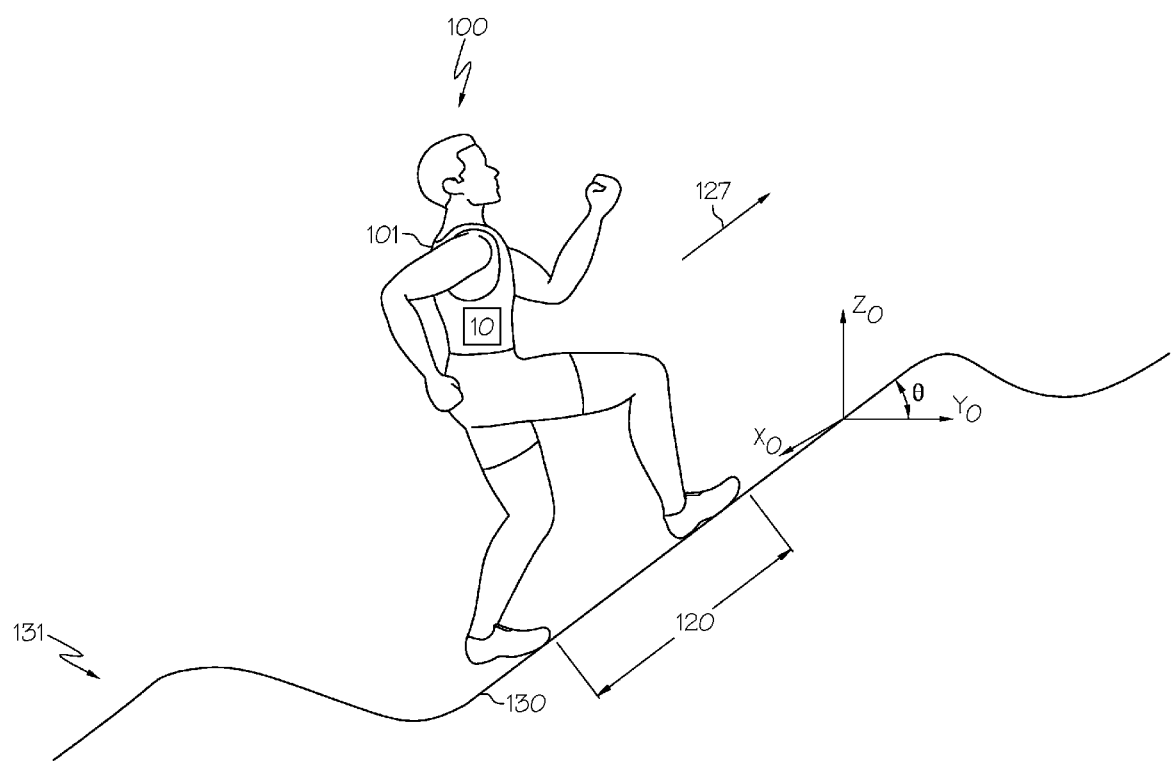
FIG. 5 shows a user running up a hill while the personal navigation system estimates the user's position in accordance with the present invention.

An exemplary user is shown in FIGS. 3, 4 and 5. FIG. 3 shows a user represented generally by the numeral 100, who is running while the personal navigation system 11 estimates the user's position in accordance with the present invention. The user 100 of the personal navigation system 11 is also referred to here as the "human 100" or "person 100." As shown in FIG. 3, the navigational heading, represented generally by the vector labeled with the numeral 105, of the person is in the $Y_o$ direction according to the basis vectors $X_o$, $Y_o$ and $Z_o$. The user 100 has a step length represented generally by the numeral 110. The inertial navigation processing block 44 determines the heading of the user 100. Since the personal navigation system 11 is strapped to the torso 101 of the user 100, the heading 105 is defined as the direction in which the torso 101 is facing. The direction of motion shown as vector 125 of the user 100 is parallel to the $Y_o$ direction. The direction of motion of the user 100 is computed by differencing the navigation position at the start of the step from the navigation position at the end of the step, then determining the angle of this vector quantity relative to north. This angle is used as the direction of motion. As shown in FIG. 3, the navigation heading 105 of user 100 and the direction of motion of user 100 would be generally the same, indicating the user 100 was moving forward.

FIG. 4 shows a user 100 walking backward while the personal navigation system 11 estimates the user's position in accordance with the present invention. As shown in FIG. 4, the navigation heading 105 of the user 100 is in the $Y_o$ direction and the user 100 is walking in the $-Y_o$ direction as shown by the vector 126 which is anti-parallel to the navigation heading 105. The user 100 has a step length represented generally by the numeral 115, which is smaller than the step length 110 of the user when running forward.

At block 208, the motion classification algorithm in the personal navigation system determines the direction of motion from the angular difference between the navigation heading and the angle of the vector from the position at the start of a step to the end of the step.

At block 210, the motion classification algorithm 50 determines the motion type from the step period and the direction of motion relative to the navigation heading. The direction of travel is determined by comparing navigation heading to direction of motion. In one implementation of this embodiment, motion classification algorithm 50 in the personal navigation system 11 determines if the angular difference between the navigation heading and the direction of motion is within a selected range of motion. For the exemplary user 100 shown in FIG. 3, the motion classification algorithm 50 determines the direction of motion 125 of the user 100 and the heading $Y_o$ are parallel so the angular difference between the navigation heading 105 and the direction of motion is zero. In this case, motion classification algorithm 50 determines that the user 100 is moving forward. For the exemplary user shown in FIG. 4, the motion classification algorithm 50 determines the direction of motion 125 of the user 100 and the heading $Y_o$ are anti-parallel so the angular difference between the navigation heading 105 and the direction of motion is 180°. In this case, the motion classification algorithm 50 determines that the user 100 is moving backward.

In one implementation of this embodiment, the angular difference between the navigation heading and the direction of motion is 90° and the user is stepping sideways. In another implementation of this embodiment, if the angular difference between the navigation heading and the direction of motion is between a selected range of motion of 0° and 46°, the personal navigation system determines the user is stepping forward. Then in this exemplary case, if the angular difference between the navigation heading and the direction of motion is between a selected range of motion of 46° and 135°, the personal navigation system determines the user is stepping sideways. Likewise, if the angular difference between the navigation heading and the direction of motion is between a selected range of motion of 136° and 180°, the personal navigation system determines the user is stepping backward.

At block 210, the motion classification algorithm also determines the type of motion (walk or run), by comparing the step period to the threshold calibrated for the user 100. In one implementation of this embodiment, the motion classification algorithm 50 declares the motion type as "walking" if the step period is greater than the threshold, and declares the motion type as "running" if the step period is less than the threshold.

At block 212, the motion classification algorithm determines a step length estimate based on the motion type and the direction of motion. In one implementation of this embodiment, the motion classification algorithm 50 in the personal navigation system 11 determines the step length estimate. The step length estimate is output from the motion classification processing block 51 to the Kalman filter processing block 20.

At block 214, the Kalman filter processing block 20 computes the Kalman filter measurement a navigation solution from the inertial navigation processing block 44. The Kalman filter processing block 20 sums the step length estimate over the Kalman filter interval to determine the distance traveled estimate from the motion classification algorithm. The Kalman filter processing block 20 computes the position difference between the navigation solution at the start of the Kalman interval and the navigation solution at the end of the Kalman interval. This is the navigation system distance traveled estimate. The motion classification distance traveled estimate is subtracted from the navigation distance traveled estimate to form the measurement to the Kalman filter 21 (this is a vector measurement).

At block 216, the Kalman filter computes the chi-squared residuals based on the Kalman filter measurement. These are normalized residuals describing the statistical fit of the measurement relative to previous measurements and other known information, such as the GPS solution. In one implementation of this embodiment, the Kalman filter 21 computes the chi-squared residuals based on the Kalman filter measurement.

At block 218, the chi-squared residuals are tested against a predetermined threshold to detect erroneous results in the distance-traveled at the Kalman filter. In one implementation of this embodiment, the threshold is set to 3.0 sigma. In one implementation of this embodiment, the Kalman filter processing block 20 of the personal navigation system 11 of FIG. 1B determines if the Kalman filter 21 chi-squared residuals exceed the threshold. If the residuals do not exceed the threshold, the flow of method 200 proceeds to block 220. If the residuals do exceed the threshold, the flow of method 200 proceeds to block 222.

At block 220, since the chi-squared residuals are less than the threshold, the Kalman filter processes the measurement and computes system corrections to the motion classification algorithm model for the user 100 and corrections to the inertial navigation processing block 44. The flow proceeds to block 224.

At block 222, the Kalman filter 21 rejects the distance traveled estimate based on the detected erroneous results since the chi-squared residuals are greater than the threshold and sets the system corrections to zero. The system corrections that are set to zero include the corrections to the motion classification algorithm model for the user 100 and the corrections to the inertial navigation processing block 44. During block 222, the Kalman filter does not processes the measurement. In this case, the personal navigation system operates without corrections. The flow proceeds to block 224.

At block 224, the Kalman filter corrections to the inertial navigation processing block 44, and the motion classification algorithm are applied. In the event the corrections are zero (for example, the Kalman filter measurement was not used at block 222), the corrections to not change the inertial navigation processing block 44 outputs, and the system operates in the equivalent of a free inertial mode without the benefit of corrections. By implementing block 214 through block 224, the error in the step length measurement (distance traveled estimate) are evaluated by the Kalman filter 21 and then the motion classification processing block 51 and the inertial navigation processing block 44 receive corrections to the step length model from the Kalman filter 21 if the error does not exceed the threshold.

The flow proceeds to block 204 and the flow from block 204 through to block 224 is repeated. The method 200 is implemented as long as the user is estimating foot travel position. In one implementation of this embodiment, the user presses a button on an exemplary handheld controller to terminate the flow of method 200.

In one implementation of this embodiment, the distance-traveled estimate received at the Kalman filter processing block is modified by input received at the Kalman filter processing block 20 from the terrain correlation processing block 71. FIG. 5 shows a user 100 running up a hill while the personal navigation system estimates the person's position in accordance with the present invention. The accelerometer 46 determines the direction of motion of the user 100. The direction of the movement of the user 100 is shown by vector 127, which is parallel to the slope represented generally by the numeral 130 of the terrain represented generally by the numeral 131. The navigation heading of the user 100 is parallel to the $Y_o$ direction which is at an angle $\theta$ with respect to the vector 127. Thus, the user 100 has a step length represented generally by the numeral 120, which is smaller than the step length 110 of the user when running forward (FIG. 3). In one implementation of this embodiment, the step length 120 for the distance-traveled estimate is adjusted from the modeled step length by a factor of cosine $\theta$. In another implementation of this embodiment, the terrain correlation processing block 71 inputs data indicative of the location of the user to the motion classification processing block 51 and the motion classification processing block 51 executes the motion classification algorithm 50 to adjust the distance-traveled estimate based on input from the terrain correlation processing block 71. In another implementation of this embodiment, the horizontal step length (i.e., in the direction of $Y_o$) is estimated directly by the motion classification algorithm. In this implementation, the motion model for the user 100 assumes that the same model used for walking/running on nominally flat surfaces applies to walking/running up or down hills.

Figure 6:
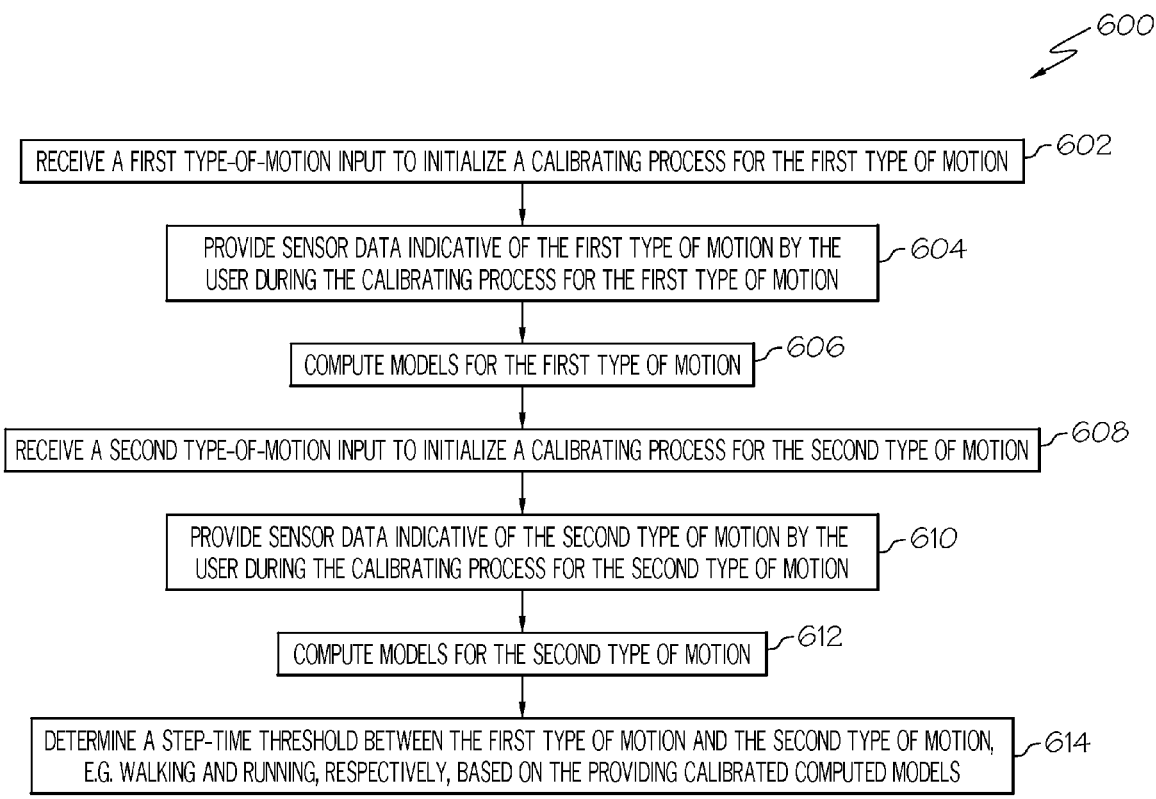
FIG. 6 is a flow diagram of one embodiment of a method to calibrate models for types of motion in accordance with the present invention.
Figure 7:
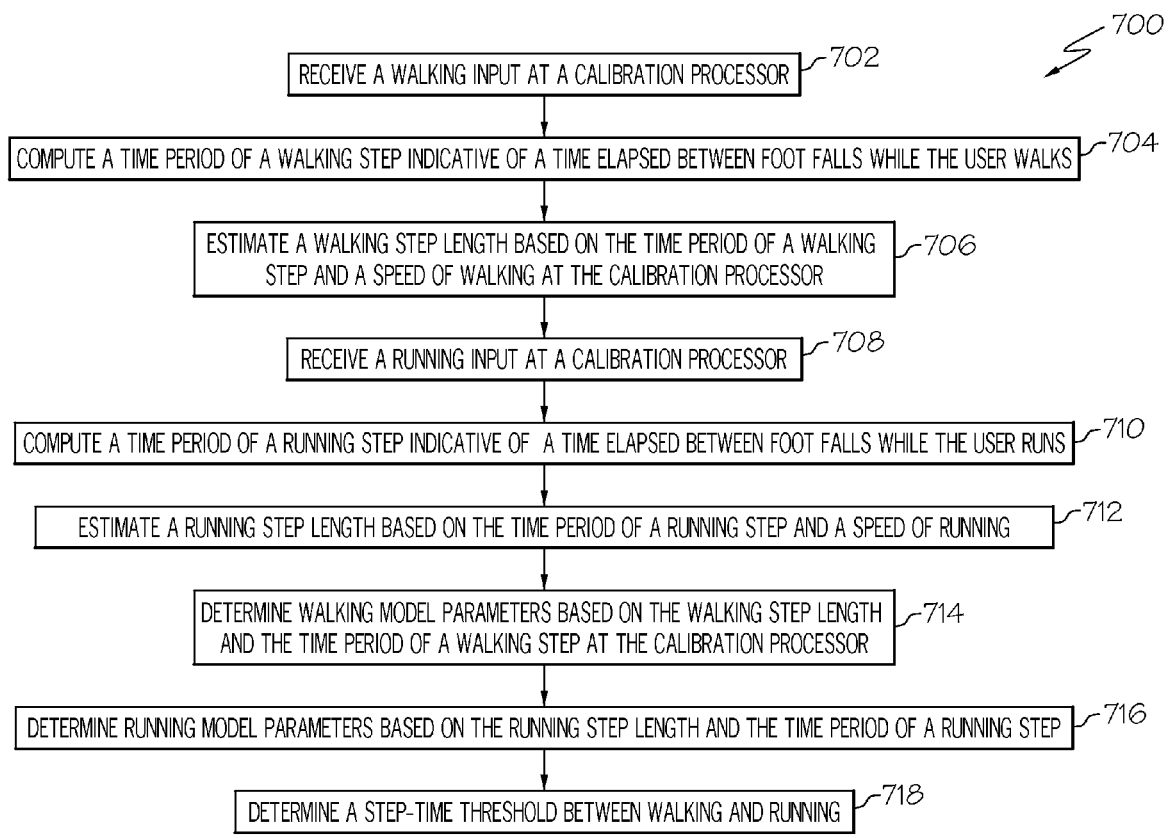
FIG. 7 is a flow diagram of one embodiment of a method to calibrate models for walking and running in accordance with the present invention.

The discussion of FIGS. 6 and 7 describe a calibration process. FIG. 6 is a "generalized" description, and FIG. 7 is a more specific description of the calibration process. During the calibration process two data points are determined for each motion type. For example, the sensors on the user collect data while the user walks fast on a path of known length, walks slowly on the same path, runs fast on the same path, and then runs slowly on the same path. The path is either pre-measured or is input when the user presses a button on an exemplary handheld controller.

The walking and running models are relatively simple linear models with two parameters. These parameters are easily computed given two measurement points. For example, if the average step time for a user walking 3.0 mph is known, and the step time for the user walking at 4.5 mph is also known, the model parameters are computed.

The calibration mode requires the user to walk a predetermined distance at two speeds (fast walk and slow walk) and to run the predetermined distance at two speeds (fast run and slow run). Thurs there are four phases to the calibration process: fast walk phase, slow walk phase, the fast run phase and the slow run phase. The start and end time of each phase is recorded when the user presses a button on an exemplary handheld controller. The steps are counted by the system between the start and end times. Based on the number of steps, the known distance, and the time taken (end time–start time), the average speed, step length, and step time is computed by the system. After all the phases (slow walk, fast walk, slow run, and fast run) are complete, the models parameters for walking and running are computed.

The equations for the model parameters are:

temp=avg_step_length[slow_walk]*avg_step_length [fast_walk];

L0[walk]=(temp*avg_step_period[slow_walk]−temp*avg_step_period[fast_walk])/(avg_step_length[fast_walk]*avg_step_period[slow_walk]−avg_step_length[slow_walk]*avg_step_period[fast_walk]);

Slope[i]=avg_step_period[fast_walk]−(avg_step_period[fast_walk]/avg_step_length[fast_walk])*L0[walk].

The same equations applicable for running by replacing slow_walk with slow_run, fast walk with fast run, and walk with run.

FIG. 6 is a flow diagram of one embodiment of a method 600 to calibrate models for types of motion in accordance with the present invention. Method 600 is described with reference to the exemplary personal navigation system 11 of FIG. 1B which includes the calibration processing block 80. In another implementation of this embodiment, the calibration processing block is separate from the personal navigation system and is used in conjunction with the personal navigation system during the calibration. In this implementation, the calibrated models are downloaded to the personal navigation system after the calibration is complete or during the calibration.

At block 602, the calibration processing block receives a first type-of-motion input to initialize a calibrating process for the first type of motion. In one implementation of this embodiment, the calibration processing block is the exemplary calibration processing block 80 of personal navigation system 11 as shown in FIG. 1B. In another implementation of this embodiment, the first type-of-motion input is a WALK type of motion. In yet another implementation of this embodiment, the first type-of-motion input is a RUN type of motion. In yet another implementation of this embodiment, the first type-of-motion input is one of a SLOW WALK type of motion, a FAST WALK type of motion, a SLOW RUN type of motion, and a FAST RUN type of motion. STOP is another type of motion but the sensors in the personal navigation system 11 do not need to be calibrated for the stop type of motion. In yet another implementation of this embodiment, the calibration processing block receives the type-of-motion input via a human input 42.

At block 604, the sensors providing sensor data indicative of the first type of motion made by the user during the calibrating process for the first type of motion. In the implementation in which the first type of motion is WALK, the user of the personal navigation system 11 straps on the personal navigation system 11 and walks while the sensors 32 output sensor data to the calibration processing block 80. In one implementation of this embodiment, the calibration processing block 80 is part of the personal navigation system 11 and the sensors 30 are communicatively coupled to the calibration processing block 80 vie trace lines. In another implementation of this embodiment, the calibration processing block is not part of the personal navigation system and the sensors are communicatively coupled to the calibration processing block via one or more of a wireless communication link (for example, a radio-frequency (RF) communication link) and/or a wired communication link (for example, an optical fiber or copper wire communication link).

In the implementation in which the first type of motion is RUN, the user of the personal navigation system 11 straps on the personal navigation system 11 and runs while the sensors 32 output sensor data to the calibration processing block 80 as described above.

At block 606, the calibration processing block 80 executes software to compute models for the first type of motion. In the implementation in which the first type of motion is WALK, the calibration processing block 80 computes the walking model parameters $l_{0walk}$ and $S_{walk}$. In the implementation in which the first type of motion is RUN, the calibration processing block 80 computes the walking model parameters $l_{0run}$ and $S_{run}$.

At block 608, the calibration processing block receives a second type-of-motion input to initialize a calibrating process for the second type of motion. In one implementation of this embodiment, the calibration processing block is the exemplary calibration processing block 80 of personal navigation system 11 as shown in FIG. 1B. In another implementation of this embodiment, the first type-of-motion input was a WALK type of motion and the second type-of-motion input is a RUN type of motion. In yet another implementation of this embodiment, the first type-of-motion input was a RUN type of motion and the second type of motion is a WALK type of motion. In yet another implementation of this embodiment, the second type-of-motion input is one of a SLOW WALK type of motion, a FAST WALK type of motion, a SLOW RUN type of motion, and a FAST RUN type of motion. In yet another implementation of this embodiment, the calibration processing block 80 receives the type-of-motion input via a human input 42.

At block 610, the sensors, such as sensors 30 in the personal navigation system 11 of FIG. 1B, provide sensor data indicative of the second type of motion made by the user during the calibrating process for the second type of motion. In the implementation in which the second type of motion is WALK, the user of the personal navigation system 11 straps on the personal navigation system 11 and walks while the sensors 30 output sensor data to the calibration processing block 80. In the implementation in which the second type of motion is RUN, the user of the personal navigation system 11 straps on the personal navigation system 11 and runs while the sensors 30 output sensor data to the calibration processing block 80 as described above.

At block 612, the calibration processing block 80 executes software to compute models for the second type of motion. In the implementation in which the second type of motion is WALK, the calibration processing block 80 computes the walking model parameters $l_{0walk}$ and $S_{walk}$. In the implementation in which the second type of motion is RUN, the calibration processing block 80 computes the walking model parameters $l_{0run}$ and $S_{run}$.

At block 614, the calibration processing block determines a step-time threshold between walking and running based on the providing calibrated computed models. Software in the calibration processing block is executed to generate the step-time threshold according to equations (1) and (2) described above with reference to FIG. 1B.

FIG. 7 is a flow diagram of one embodiment of a method 700 to calibrate models for walking and running in accordance with the present invention. Method 700 is described with reference to the exemplary personal navigation system 11 of FIG. 1B.

At block 702, the calibration processing block receives a walking input, such as WALK, at a calibration processing block. In one implementation of this embodiment, the calibration processing block is the exemplary calibration processing block 80 of personal navigation system 11 as shown in FIG. 1B. In another implementation of this embodiment, the walking input is a WALK type of motion. In yet another implementation of this embodiment, the calibration processing block 80 in the personal navigation system 11 receives the walking input via a human input 42.

At block 704, the calibration processing block computes a time period $dt_{swalk}$ of a walking step indicative of a time elapsed between foot falls while the user walks. The user walks at two different walking speeds along the same path of a known length.

At block 706, the calibration processing block estimates a walking step length $dl_{walk}$ based on the time period $dt_{s,walk}$ of a walking step and a speed of walking at the calibration processing block. In one implementation of this embodiment, the calibration processing block is the calibration processing block 80 of personal navigation system 11 and the calibration processing block 80 executes software including the algorithm $$dl_{walk} = \frac{l_0 dt_{s,walk}}{dt_s - S}.$$

The walking step length $dl_{walk}$ of a walking step is computed based on sensor data received at the calibration processing block 80.

At block 708, the calibration processing block receives a running input at the calibration processing block. In one implementation of this embodiment, the calibration processing block is the calibration processing block 80 of personal navigation system 11 and the calibration processing block 80 receives the running input as a RUN type of motion input to the human input 42.

At block 710, the calibration processing block computes a time period $dt_{srun}$ of a running step indicative of a time elapsed between foot falls while the user runs. The computing a time period $dt_{s,run}$ of a running step is based on sensor data received at the calibration processing block. The user runs at two different running speeds along the same path of a known length. The path is the same path used in block 706.

At block 712, the calibration processing block estimates a running step length $dl_{run}$ based on the time period of a running step $dt_{s,run}$ and a speed of running. In one implementation of this embodiment, the calibration processing block is the calibration processing block 80 of personal navigation system 11 and the calibration processing block 80 executes software including the algorithm $$dl_{run} = \frac{l_0 dt_{s,run}}{dt_s - S}.$$

The running step length $dl_{run}$ of a walking step is computed based on sensor data received at the calibration processing block 80.

At block 714, the calibration processing block determines walking model parameters $l_{0walk}$ and $S_{walk}$ based on the walking step length $dl_{walk}$ of and the time period $dt_{s,walk}$ of a walking step at the calibration processing block.

At block 716, the calibration processing block determines running model parameters $l_{0run}$ and $S_{run}$ based on the running step length $dl_{run}$ and the time period $dt_{s,run}$ of a running step are the running model parameters.

At block 718, the calibration processing block determines a step-time threshold $dt_{threshold}$ between walking and running based on the providing calibrated computed models. In one implementation of this embodiment, the calibration processing block is the calibration processing block 80 of personal navigation system 11 and the calibration processing block 80 executes software including the algorithm in which the threshold speed used is 2.12344 m/s. The threshold speed can be adjusted based on the individual user.

$$dt_{threshold} = \frac{\left(\frac{l_{0walk}}{2.12344} + S_{walk}\right) + \left(\frac{l_{0run}}{2.12344} + S_{run}\right)}{2}.$$

When the calibration of the personal navigation system 11 as described in method 700 is complete, the calibration processing block downloads the $dt_{threshold}$, the walking model parameters $l_{0walk}$ and $S_{walk}$ and the running model parameters $l_{0run}$ and $S_{run}$ into the Kalman filter processing block 20 for implementation during a use of the personal navigation system 11.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A personal navigation system, the system comprising:
one or more sensors adapted to sense motion of a human and to output signals corresponding to the motion of the human;
a human-motion-classification processing block adapted to receive sensor data from the one or more sensors, the human-motion-classification processing block comprising:
a Kalman filter processing block adapted to execute at least one Kalman filter;
an inertial navigation processing block adapted to receive input sensor data from the one or more sensors and to output a navigation solution; and
a motion classification processing block adapted to execute a motion classification algorithm that implements a step-time threshold between two types of motion, the step-time threshold determined from running model parameters, walking model parameters, and a threshold speed, wherein the motion classification processing block is further adapted to identify a type of motion, and to output a distance-traveled estimate to the Kalman filter processing block based on the identified type of motion, wherein the at least one Kalman filter provides corrections to the motion classification processing block.

2. The system of claim 1, the human-motion-classification processing block further comprising:
a terrain correlation processing block adapted to execute a terrain correlation algorithm to provide an estimate of terrain correlated to a position of the human in order to bound the navigational error of the personal navigation system.

3. The system of claim 1, wherein the types of motion comprise walking forward, walking backward, running forward, stopped, and walking sideways.

4. The system of claim 1, wherein the sensors comprise:
one or more global positioning systems, one or more accelerometers, one or more gyroscopes, one or more magnetic sensors, one or more pressure sensors, one or more altimeters, one or more inertial sensors, and combinations thereof.

5. The system of claim 1, wherein the human-motion-classification processing block further comprises:
a calibration processing block to calibrate the step-time threshold, wherein the running model parameters, the walking model parameters, and the threshold speed are calibrated for each user.

6. A method for estimating foot-travel position, the method comprising:
receiving sensor data at a motion classification algorithm having calibrated computed models for types of motion calibrated to a user;
determining a step length estimate at the motion classification algorithm; and
receiving corrections to the step length model from a Kalman filter, wherein the calibrated computed models for types of motion include running model parameters, and walking model parameters that are used to determine a step-time threshold.

7. The method of claim 6, wherein receiving corrections to the distance-traveled model from a Kalman filter comprises:
detecting erroneous results in the step length estimate at the Kalman filter;
rejecting the step length estimate based on the detected erroneous results; and
operating a personal navigation system without corrections based on the rejecting.

8. The method of claim 6, further comprising:
calibrating initial models for types of motion for the user; and
providing the calibrated models in the motion classification algorithm.

9. The method of claim 8, wherein calibrating models for types of motion for the user comprises:
receiving a first type-of motion input to initialize a calibrating process for the first type of motion;
providing sensor data indicative of the first type of motion by the user during the calibrating process for the first type of motion;
computing models for the first type of motion;
receiving a second type-of motion input to initialize a calibrating process for the second type of motion;
providing sensor data indicative of the second type of motion by the user during the calibrating process for the second type of motion; and
computing models for the second type of motion.

10. The method of claim 9, wherein receiving a first type-of motion input comprises receiving a walking input at a calibration processing block, and wherein computing models for the first type of motion comprises:
computing a time period of a walking step indicative of a time elapsed between foot falls while the user walks, wherein the computing a time period of a walking step is based on sensor data received at the calibration processing block;

estimating a walking step length based on the time period of a walking step and a speed of walking at the calibration processing block; and determining walking model parameters based on the walking step length and the time period of a walking step at the calibration processing block.

11. The method of claim 10, wherein receiving a second type-of-motion input comprises receiving a running input at a calibration processing block, and wherein computing models for the second type of motion comprises:

computing a time period of a running step indicative of a time elapsed between foot falls while the user runs, wherein the computing a time period of a running step is based on sensor data received at the calibration processing block;

estimating a running step length based on the time period of a running step and a speed of running; and determining running model parameters based on the running step length and the time period of a running step.

12. The method of claim 11, the method further comprising:

determining the step-time threshold between walking and running based on the providing calibrated computed models.

13. The method of claim 6, the method further comprising:
determining a navigation heading of the user;
determining a direction of motion of the user; and
determining if an angular difference between the navigation heading and the direction of motion is within a selected range of angles 14. The method of claim 13, the method further comprising:

determining the user is stepping backward if the navigation heading and the direction of motion are substantially opposite each other and within a selected range of opposing angles.

15. A processor readable medium having programmable-processor executable instructions for performing a method comprising:

receiving sensor data at a motion classification algorithm having calibrated computed models for types of motion calibrated to a user;

determining a step length estimate at the motion classification algorithm; and receiving corrections to the step length model from a Kalman filter, wherein the calibrated computed models for types of motion include running model parameters, and walking model parameters that are used to determine a step-time threshold.

16. The medium of claim 15, wherein the programmable-processor executable instructions for receiving corrections to the distance-traveled estimate from a Kalman filter comprise programmable-processor executable instructions for:

detecting erroneous results in the step length estimate at the Kalman filter;

rejecting the step length estimate based on the detected erroneous results;

operating a personal navigation system without corrections based on the rejecting;

calibrating models for types of motion for the user; and providing the calibrated models in the motion classification algorithm.

17. The medium of claim 16, wherein the programmable-processor executable instructions for calibrating models for types of motion for the user comprise programmable-processor executable instructions for:

receiving a first type-of-motion input to initialize a calibrating process for the first type of motion;

providing sensor data indicative of the first type of motion by the user during the calibrating process for the first type of motion;

computing models for the first type of motion:

receiving a second type-of-motion input to initialize a calibrating process for the second type of motion;

providing sensor data indicative of the second type of motion by the user during the calibrating process for the second type of motion; and computing models for the second type of motion.

18. The medium of claim 17, wherein the programmable-processor executable instructions for receiving a first type-of-motion input comprise programmable-processor executable instructions for:

receiving a walking input at a calibration processing block, and wherein the programmable-processor executable instructions for computing models for the first type of motion comprise programmable-processor executable instructions for:

computing a time period of a walking step indicative of a time elapsed between foot falls while the user walks, wherein the computing a time period of a walking step is based on sensor data received at the calibration processing block;

estimating a walking step length based on the time period of a walking step and a speed of walking at the calibration processing block; and determining walking model parameters based on the walking step length and the time period of a walking step at the calibration processing block.

19. The medium of claim 18, wherein the programmable-processor executable instructions for receiving a second type-of-motion input comprise programmable-processor executable instructions for:

receiving a running input at a calibration processing block and wherein, the programmable-processor executable instructions for computing models for the second type of motion comprise programmable-processor executable instructions for:

computing a time period of a running step indicative of a time elapsed between foot falls while the user runs, wherein the computing a time period of a running step is based on sensor data received at the calibration processing block;

estimating a running step length based on the time period of a running step and a speed of running;

determining running model parameters based on the running step length and the time period of a running step, and wherein the medium further comprises programmable-processor executable instructions for determining the step-time threshold between walking and running based on the providing calibrated computed models.

20. The medium of claim 15, further comprising programmable-processor executable instructions for:

determining a navigation heading of the user;
determining a direction of motion of the user;
determining if an angular difference between the navigation heading and the direction of motion is within a selected range of angles; and determining the user is stepping backward if the navigation heading and the direction of motion are substantially opposite each other and within a selected range of opposing angles.

* * * * *